United States Patent
Cai et al.

(10) Patent No.: US 10,360,401 B2
(45) Date of Patent: Jul. 23, 2019

(54) PRIVACY PROTECTION IN NETWORK INPUT METHODS

(71) Applicant: International Business Machines Corporation, Armonk, NY (US)

(72) Inventors: Keke Cai, Beijing (CN); Honglei Guo, Beijing (CN); Zhong Su, Beijing (CN); Changhua Sun, Beijing (CN); Guoyu Tang, Beijing (CN); Enliang Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 15/219,528

(22) Filed: Jul. 26, 2016

(65) Prior Publication Data

US 2018/0032753 A1     Feb. 1, 2018

(51) Int. Cl.
  *G06F 21/00*   (2013.01)
  *G06F 21/62*   (2013.01)
  *G06F 21/57*   (2013.01)
  *H04L 29/06*   (2006.01)

(52) U.S. Cl.
  CPC ......... *G06F 21/6245* (2013.01); *G06F 21/57* (2013.01); *G06F 21/6263* (2013.01); *H04L 63/1408* (2013.01)

(58) Field of Classification Search
  None
  See application file for complete search history.

(56) References Cited

U.S. PATENT DOCUMENTS

| | | | |
|---|---|---|---|
| 2004/0128552 A1* | 7/2004 | Toomey | G06F 21/57 726/22 |
| 2010/0063929 A1 | 3/2010 | Torigai et al. | |
| 2010/0125891 A1* | 5/2010 | Baskaran | G06F 21/6218 726/1 |
| 2012/0303558 A1* | 11/2012 | Jaiswal | G06N 99/005 706/12 |

(Continued)

OTHER PUBLICATIONS

Burkhart, M. et al., "How to Protect Data Privacy in Collaborative Network Security" ERCIM-News 90; Jun. 13, 2016, 3 pgs.

(Continued)

*Primary Examiner* — Andrew J Steinle
(74) *Attorney, Agent, or Firm* — Cantor Colburn LLP; Grant Johnson

(57) ABSTRACT

Aspects of the present invention include a method, system and computer program product for preventing certain sensitive private or personal information of a user from being recorded or stored and/or uploaded by a third party input method editor while the user is entering information into a computer that is part of a network. The method includes a processor creating a model containing privacy information about a user of a computer; extracting the privacy information from the model; analyzing the information entered into the computer by the user; determining that the user has entered any of the privacy information into the computer; and if the processor has determined that the user has entered any of the privacy information into the computer, preventing any recording, storing or uploading of the privacy information.

17 Claims, 6 Drawing Sheets

(56) References Cited

U.S. PATENT DOCUMENTS

2014/0157121 A1  6/2014  Jiang et al.
2014/0282949 A1  9/2014  Nath et al.

OTHER PUBLICATIONS

Nan, Y. et al., "UIPicker: User-Input Privacy Indentification in Mobile Applications" 24th USENIX Security Symposium, Aug. 12-14, 2015, Washington, D.C.; pp. 993-1008; ISBN 978-1-931971-232.

* cited by examiner

PRIVACY PROTECTION IN NETWORK INPUT METHODS

BACKGROUND

The present invention relates to the user input of information into a computer that is part of a network, and more specifically, to a method, system or computer program product that prevents certain sensitive private or personal information of a user from being recorded or stored or uploaded by a third party input method editor while the user is entering information into a computer that is part of a network.

In written language, a logogram or logograph is a written character that represents a word or phrase. Examples of logograms include Chinese characters, Japanese kanji, some Egyptian hieroglyphs, and some graphemes in Cuneiform script. The use of logograms in writing is called logography. A writing system that is based on logograms/logographs is called a logographic system. In alphabets and syllabaries, individual written characters represent sounds rather than concepts. These characters are called phonograms. Unlike logograms, phonograms do not necessarily have meaning by themselves, but are combined to make words and phrases that have meaning. Writing language in this way is called phonemic orthography. For logogram-based languages, an input method editor ("IME") or similar type of software system is often used to enable a user of a computer to enter such logogram-based characters into the computer using a keyboard. Often, the IME is provided by a third party, and a user is required to transmit sensitive private/personal information through the IME and over a network.

SUMMARY

According to one or more embodiments of the present invention, a computer-implemented method includes creating, by a processor, a model containing privacy information about a user of a computer; and extracting, by the processor, the privacy information from the model. The method also includes analyzing, by the processor, the information entered into the computer by the user; and determining, by the processor, that the user has entered any of the privacy information into the computer. The method further includes if the processor has determined that the user has entered any of the privacy information into the computer, preventing, by the processor, any recording or storing or uploading of the privacy information.

According to another embodiment of the present invention, a system includes a processor in communication with one or more types of memory, the processor configured to create a model containing privacy information about a user of a computer; extract the privacy information from the model; analyze the information entered into the computer by the user; determine that the user has entered any of the privacy information into the computer; and if the processor has determined that the user has entered any of the privacy information into the computer, the processor is configured to prevent any recording or storing or uploading of the privacy information.

According to yet another embodiment of the present invention, a computer program product includes a non-transitory storage medium readable by a processing circuit and storing instructions for execution by the processing circuit for performing a method that includes creating, by a processor, a model containing privacy information about a user of a computer; and extracting, by the processor, the privacy information from the model. The method also includes analyzing, by the processor, the information entered into the computer by the user; and determining, by the processor, that the user has entered any of the privacy information in to the computer. The method further includes if the processor has determined that the user has entered any of the privacy information into the computer, preventing, by the processor, any recording or storing or uploading of the privacy information.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
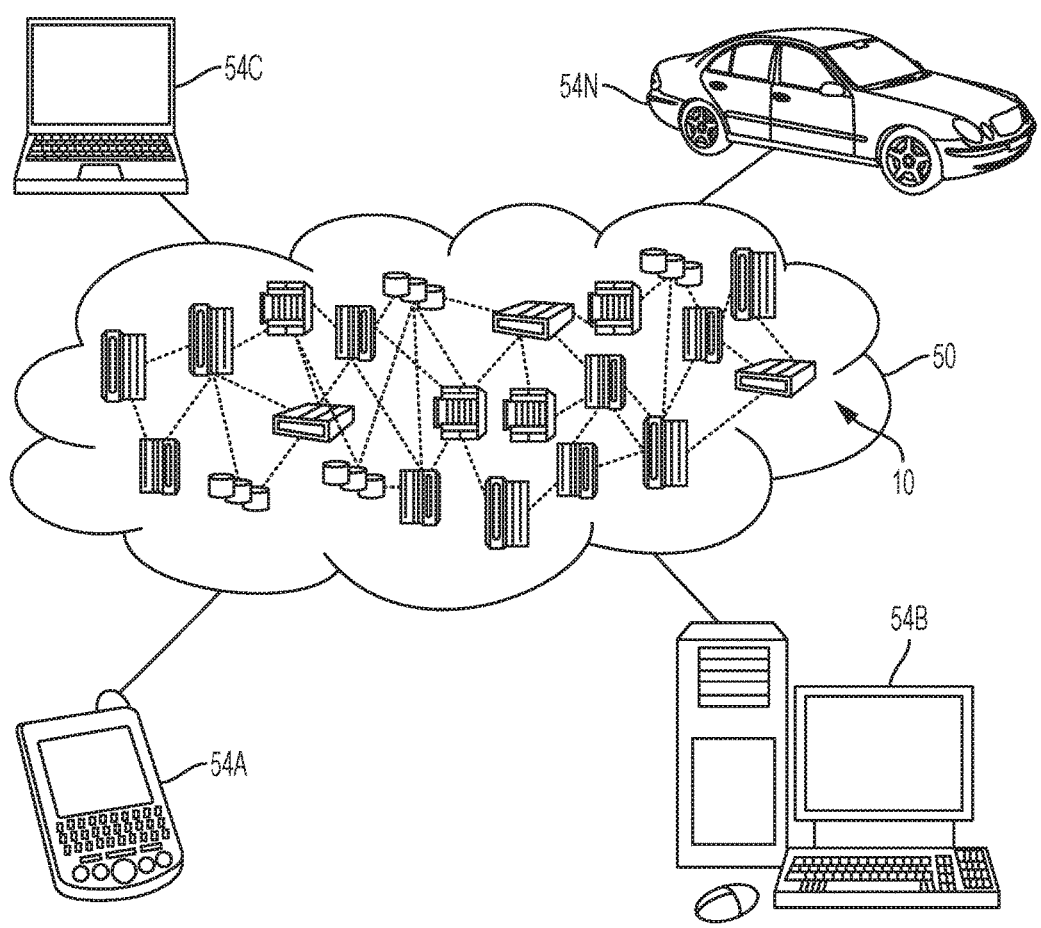
FIG. 1 depicts a cloud computing environment according to one or more embodiments of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
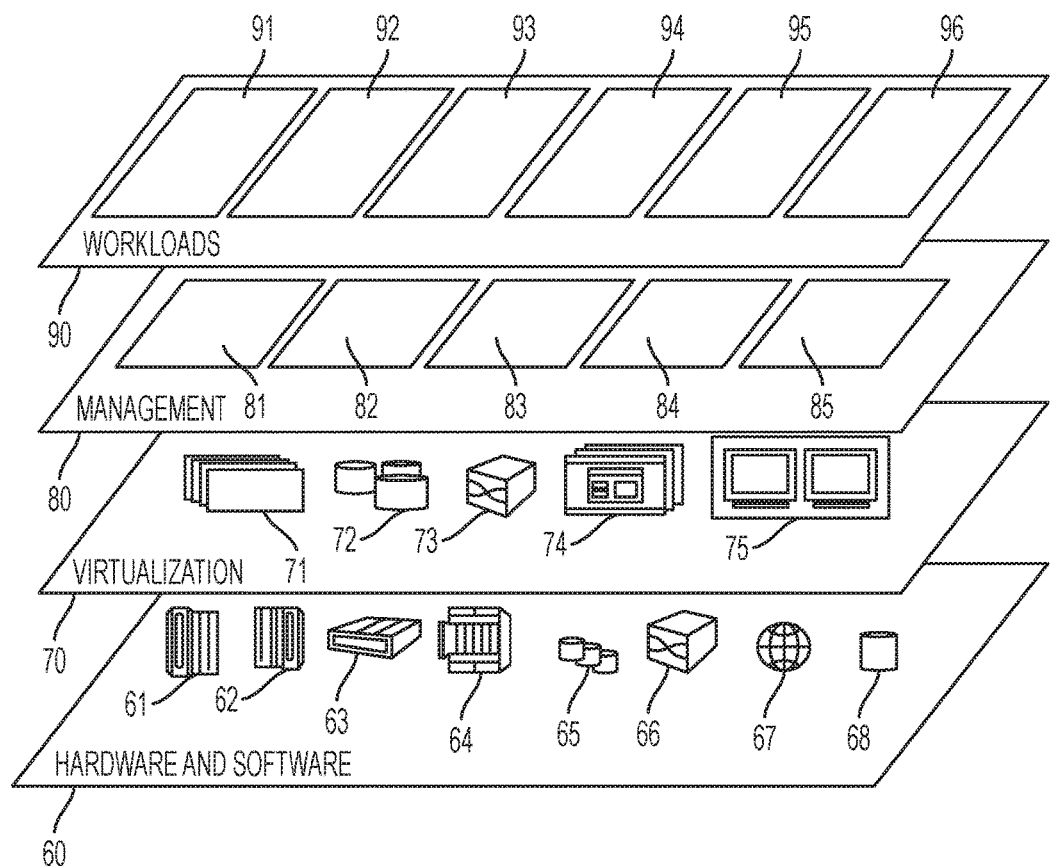
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a method 96 for preventing certain sensitive private or personal information of a user from being recorded or stored or uploaded by a third party input editor while the user is entering information into a computer that is part of a network, in accordance with one or more embodiments of the present invention.

Figure 3:
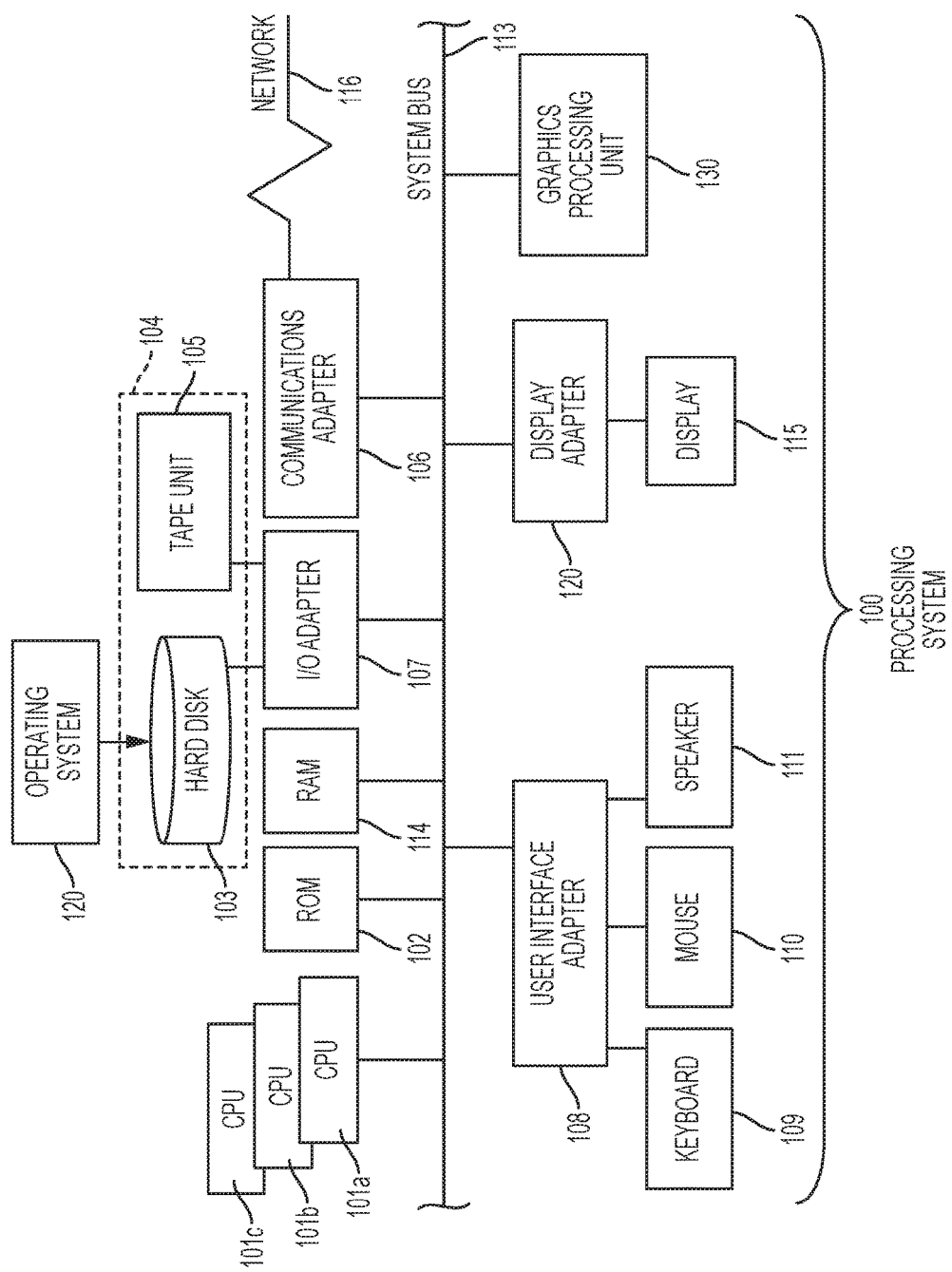
FIG. 3 depicts a block diagram illustrating one example of a processing system for practice of the teachings herein.

Referring to FIG. 3, there is shown a processing system 100 for implementing the teachings herein according to one or more embodiments. The system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Turning now to a more detailed description of technologies and/or concepts that are relevant to embodiments of the present disclosure, for logogram-based languages, an IME or similar type of software system is often used to enable a user of a computer to enter such logogram-based characters into the computer using a keyboard. The IME and other similar types of systems are generally referred to as keyboard-based input methods. A common IME software system is the Chinese Pinyin conversion system, which is a phonetic system that translates or transcribes the Chinese language characters input by the user using syllables comprising the Roman alphabet. The IME essentially "predicts" as best as possible the Chinese language characters that may result from the Roman alphabet keystrokes input by a user. A popular Pinyin system for the Chinese language is the Soguo Pinyin system provided by Sohu. Other IMEs besides phonetic based systems or Pinyin systems are available. Regardless of the type of IME, these IMEs tend to improve user input efficiency and user experience, for example, by generating popular words used by a particular user, or by personalizing the dictionary of a particular user.

The software or systems that implement these IMEs or input methods are typically provided by third parties—e.g., the Soguo Pinyin system. A concern is that when a user is entering information into a computer using a keyboard or similar device, the third party IME will record or store (and/or even upload to a remote server) all of the information that the user enters, including private or personal information that may be sensitive to the user such as, for example, usernames, passwords, addresses, phone numbers, credit card numbers, etc. The possibility of the third party IME recording, storing and/or uploading user data, either deliberately or inadvertently, exists even if the third party IME claims it does not do so. Essentially, once the user enters its sensitive private or personal information into the third party IME, the user loses control over that information.

A user may be concerned about the IME when, for example, the user is entering the information required by an Internet web site of an ecommerce merchant. That is, in such a situation the user is interfacing with a particular site or location on a public network such as the Internet. Here, the user is using the third party IME to help facilitate the input of user information into the network that the particular website needs to be able to carry out a transaction, such as the purchase of goods or services. Also, if the user frequently visits a particular one or more websites on the Internet, those websites tend to want to save or even upload the user's entered information (e.g., as a pattern) as a time convenience to the user so that the user does not need to enter all of the user's information each time the user visits that website. It would be desirable to balance the need to prevent the third party IME software system from recording or storing or uploading certain sensitive personal or private information of a user with the need for the IME software system to record or store or upload certain non-sensitive information about the user so that the user does not need to enter such non-sensitive information each time the user interacts with the IME.

In accordance with one or more embodiments of the present invention, methods, systems, and computer program products are disclosed for preventing certain sensitive private or personal information of a user from being recorded or stored and/or uploaded by a third party input method editor while the user is entering information into a computer that is part of a network, in accordance with one or more embodiments of the present invention.

Accordingly, one or more embodiments of the present invention provide users of third party IME software with a level of control over the undesirable recording or storing and/or uploading (e.g., to a remote server) by the third party IME software of the users' sensitive private or personal information.

In addition, one or more embodiments of the present invention may involve public networks such as the Internet and located in a public cloud computing environment 50 as discussed above with respect to FIGS. 1 and 2. However, embodiments are not limited as such. Instead, other embodiments may involve a network within a private cloud, a community cloud, a hybrid cloud, or some other type of cloud environment having one or more networks now known or hereinafter created or developed.

Embodiments of the present invention may be used not only in conjunction with various types of network input methods (e.g., input method editors), but also may be used in conjunction with web browsers and operating systems.

Further, embodiments of the present invention may be used not only in conjunction with computers of various types (e.g., desktops, laptops, notebooks, etc.), but may also be used in conjunction with mobile device such as, for example, tablets, PDA's, smartphones, smart watches, etc. Essentially, various embodiments of the present invention may be used with any type of computing or processing device that utilizes a keyboard or similar type of device to enable a user to enter information.

Figure 4:
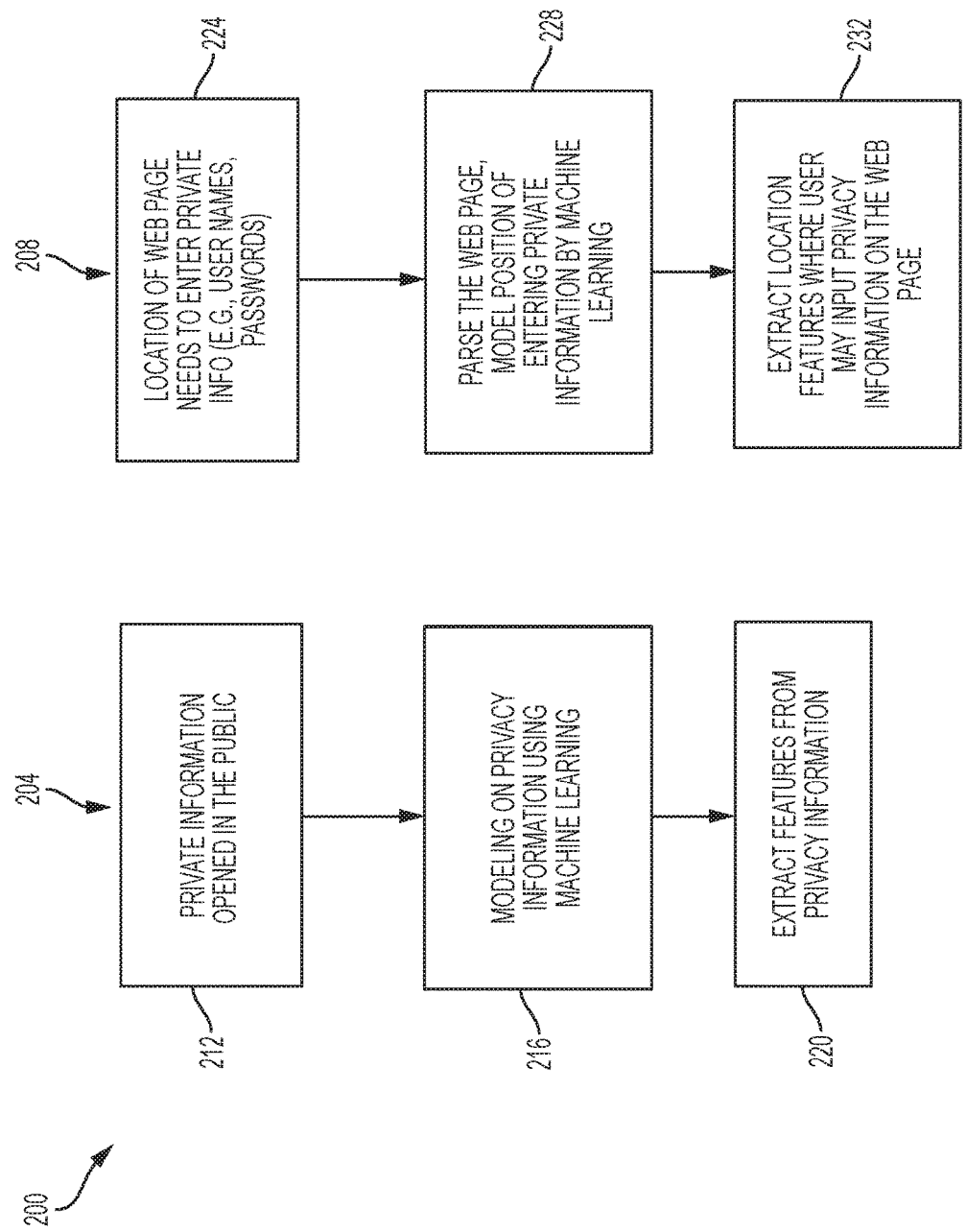
FIG. 4 depicts a flow diagram of a method for building one or more models of sensitive or privacy information about a user as the user is entering information into a computer, as part of a method for preventing certain sensitive private or personal information of a user from being recorded or stored or uploaded by a third party input method editor while the user is entering information into a computer that is part of a network, in accordance with one or more embodiments of the present invention.
Figure 5:
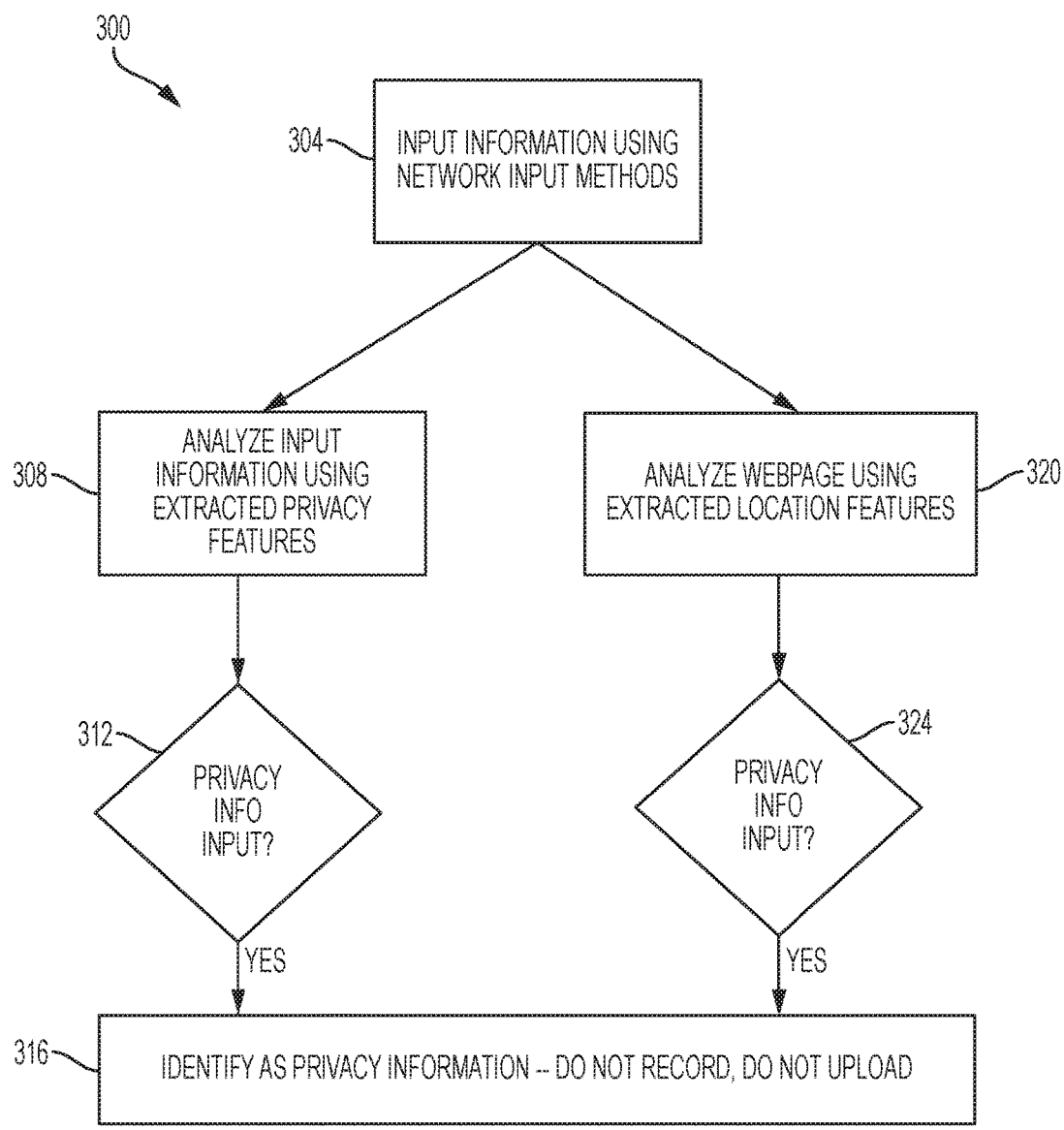
FIG. 5 depicts a flow diagram of a method for identifying privacy information of a user who is entering information using network input methods, as part of a method for preventing certain sensitive private or personal information of a user from being recorded or stored or uploaded by a third party input method editor while the user is entering information into a computer that is part of a network, in accordance with one or more embodiments of the present invention.
Figure 6:
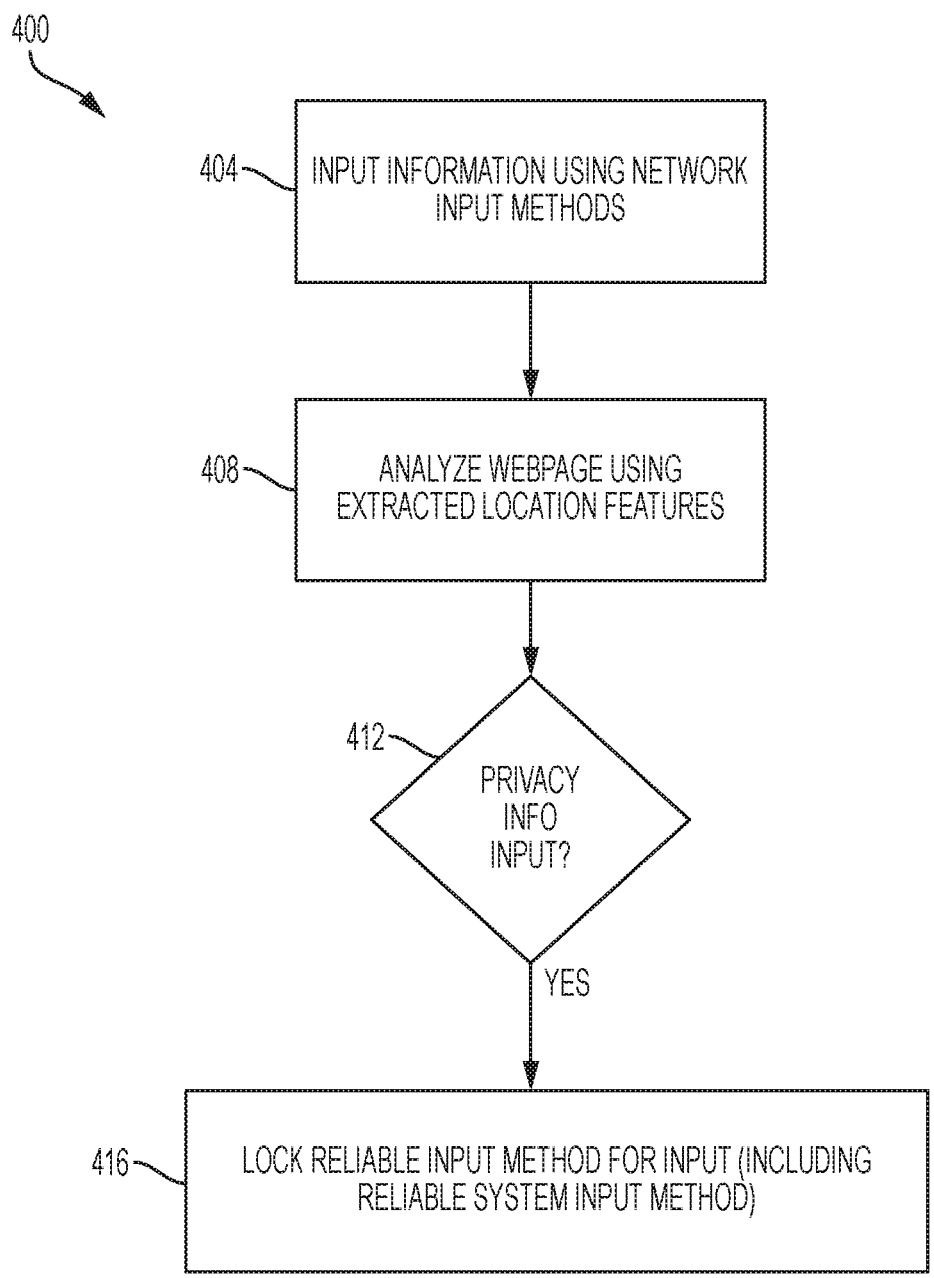
FIG. 6 depicts a flow diagram of a method for identifying privacy information of a user who is entering information using a web browser or operating system, as part of a method for preventing certain sensitive private or personal information of a user from being recorded or stored or uploaded by a third party input method editor while the user is entering information into a computer that is part of a network, in accordance with one or more embodiments of the present invention.

With reference now to FIGS. 4-6, various flow diagrams illustrates a method according to one or more embodiments of the present invention for preventing certain sensitive private or personal information of a user from being recorded or stored and/or uploaded by a third party input method editor while the user is entering information into a computer that is part of a network, in accordance with one or more embodiments of the present invention.

In one or more embodiments of the present invention, the method of FIGS. 4-6 may be embodied in software that is executed by computer elements located within a network that may reside in the cloud, such as the cloud computing environment 50 described hereinabove and illustrated in FIGS. 1 and 2. The network may comprise a public network, a private network, a community network, a hybrid network, or some other type of network configuration now known or hereinafter created or developed.

In other embodiments, the computer elements may reside on a computer system or processing system, such as the processing system 100 described hereinabove and illustrated in FIG. 3, or in some other type of computing or processing environment. The computer processing system may be part of a larger network comprising a plurality of computer and/or processing devices or systems connected together in some manner (e.g., a public network such as the Internet).

Referring now to FIG. 4, there illustrated are two flow diagrams that depict the operations within separate methods 204, 208 which are both part of a method 200 for building one or more models of sensitive or privacy information about a user as the user is entering information into a computer or after the user has entered the information. In one or more embodiments of the present invention, both of these methods 204, 208 may be continuously running (e.g., in parallel or sequentially) to thereby build the one or more privacy information models by constantly iterating through the operations of these methods 204, 208.

The method 204 involves identifying or recognizing sensitive privacy information (i.e., personal or private information about a particular user or unique to that particular user). An operation in block 212 opens or initially identifies possibly private or privacy information being input by the user.

In block 216, an operation may provide for the privacy information model to be initially built or revised (depending on whether the method 204 is being run for the first time or iteration or for iterations after the first one). The model may be built or revised using, for example, an iterative machine learning or training procedure or method, or rule base approach, that comprises the operation in block 216. Other model building methods contemplated by the method 204 of embodiments of the present invention may include privacy text analytics or pattern recognition methods.

For example, a machine learning or training method may be used to detect if a user has entered into the computer using the keyboard a sensitive piece of information such as the user's username or password. A username typically comprises a user's email address, some type of alphabetic word chosen by the user, or something similar. The machine learning or training method may be used to recognize these types of usernames. Also with respect to a password, passwords typically contain various letters, numbers and/or symbols in combination. Also, a password is typically not a common word.

Once the privacy features have been identified in the operation in block 216, a block 220 includes an operation in which those identified privacy features may be extracted from the overall privacy information entered by the user. The method then may return to the operation in block 212 so as to iteratively build and refine the model.

The method 208 may also comprise a constantly iterative method and may be utilized to identify the one or more physical locations or fields on a display screen of the computer or other type of device where any sensitive privacy information entered by the user may be located. In various embodiments, the method 208 may be utilized in conjunction with a web browser or an operating system to iteratively build a model of privacy information related to a user.

In block 224, an operation identifies the web page or operating system in which the user may be entering sensitive privacy information such as, e.g., usernames, passwords, etc. In block 228, an operation may parse the identified web page or operating system to identify the one or more physical locations or fields on that web page where the user is entering or has entered privacy information. This can be carried out, for example, using a textual semantics approach which may be a part of an iterative machine learning or training procedure or method, or rule based approach. In this way, the model is being built or refined. Similar to the method 204, other model building methods contemplated by the method 208 of embodiments of the present invention may include privacy text analytics or pattern recognition methods.

For example, the following is one example of software code for identifying the pattern or rule for the location or fields where the user has input privacy information:

```
<input type="password" id="nloginpwd" name="nloginpwd"
class="itxt itxt-error" tabindex= "2" autocomplete= "off" placeholder=
"password">
    <input type="password" class="inputstyle password id="p"
name="p" value="maxlength="16" tabindex="2">
    <input class="formIpt" tabindex="2" title="Please input password"
id="pwdInput" name="password" type="password">
```

In block 232, an operation extracts the identified physical locations or fields on the web page or operating system where the user has entered privacy information. The method then may return to the operation in block 224 so as to iteratively build and refine the model.

Referring now to FIG. 5, there illustrated is a flow diagram of a method 300 for identifying privacy information of a user who is entering information using network input methods, in accordance with one or more embodiments of the present invention. Method 300 may be run as desired or needed and in parallel with the model building methods 204, 208 of FIG. 4.

In block 304, an operation is performed in which the user is entering various types of information into a computer using a keyboard. In embodiments of the present invention, the computer may be part of a public network (e.g., the Internet), and a third party input method editor ("IME") software system may be present as well. For example the user may be entering input information in one of the Chinese, Japanese or Korean character-based languages for which and IME is well suited, as discussed in detail hereinabove. This may be done in the context of the user attempting to carry out a transaction (e.g., a purchase) on the Internet website of a marketer of products or services.

In block 308, an operation analyzes the information being input by the user (or already input by the user) by utilizing the extracted privacy features from the method 204 of FIG. 4. In block 312, a comparison operation checks whether the user is indeed entering privacy information. If the user is not entering privacy information, the method 300 may branch back to the analyze input information operation in block 308. If instead the user is entering privacy information, an operation in block 316 may prevent the IME from recording or storing and/or uploading the identified privacy information relating to the user.

Similarly, in block 320 an operation analyzes the information being input by the user (or already input by the user) by utilizing the webpage location-based extracted privacy features from the method 208 of FIG. 4. In block 324, a comparison operation checks whether the user is indeed entering privacy information. If the user is not entering privacy information, the method 300 may branch back to the analyze webpage input information operation in block 320.

If instead the user is entering privacy information, the operation in block 316 may prevent the IME from recording or storing and/or uploading (e.g., to a remote server) the identified privacy information relating to the user.

Referring now to FIG. 6, there illustrated is a flow diagram of a method 300 for identifying privacy information of a user who is entering information using network input methods in conjunction with a web browser or operating system, in accordance with one or more embodiments of the present invention. This method 400 may be run as desired or needed and in parallel with the model building methods 204, 208 of FIG. 4.

In block 404, an operation is performed in which the user is entering various types of information into a computer using a keyboard. In embodiments of the present invention, the computer may be part of a public network (e.g., the Internet), and a third party input method editor ("IME") software system may be present as well. For example the user may be entering input information in one of the Chinese, Japanese or Korean character-based languages for which and IME is well suited, as discussed in detail hereinabove. This may be done in the context of the user attempting to carry out a transaction (e.g., a purchase) on the Internet website of a marketer of products or services.

In block 408, an operation analyzes the information being input by the user (or already input by the user) by utilizing the extracted location features from the method 208 of FIG. 4. In block 412, a comparison operation checks whether the user is indeed entering privacy information. If the user is not entering privacy information, the method 400 may branch back to the analyze input information operation in block 408. If instead the user is entering privacy information, an operation in block 416 may "lock" or force the user to use a reliable method (e.g., the "safe system input method") for inputting information into the computer using the keyboard. Essentially, the safe system input method is similar to the operation in block 316 of FIG. 5 in that it prevents the IME from recording or storing and/or uploading (e.g., to a remote server) the identified privacy information relating to the user.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    creating, by a processor, a model containing privacy information about a user of a computer;
    extracting, by the processor, the privacy information from the model;
    analyzing, by the processor, information entered into the computer by the user, wherein the information is entered through an input method editor, and
    wherein the input method editor is configured to receive logogram-based language inputs;
    determining, by the processor, that the user has entered any of the privacy information into the computer; and
    if the processor has determined that the user has entered any of the privacy information into the computer, preventing, by the processor, any recording or storing of the privacy information by the input method editor.

2. The computer-implemented method of claim 1, wherein creating, by a processor, a model containing privacy information about a user of a computer, and extracting, by the processor, the privacy information from the model, may be iteratively performed to initially create the model and then refine the model.

3. The computer-implemented method of claim 1, wherein creating, by a processor, a model containing privacy information about a user of a computer comprises a machine learning process.

4. The computer-implemented method of claim 1, wherein analyzing, by the processor, the information entered into the computer by the user further comprises analyzing, by the processor, the information entered into one or more locations on a screen display.

5. The computer-implemented method of claim 4, wherein determining, by the processor, that the user has entered any of the privacy information into the computer further comprises determining, by the processor, that the user has entered any of the privacy information into the one or more locations on a screen display.

6. The computer-implemented method of claim 1, wherein analyzing, by the processor, the information entered into the computer by the user further comprises analyzing, by the processor, the information entered into the computer by the user by one of input methods, a webpage, and an operating system.

7. A system comprising:
    a processor in communication with one or more types of memory, the processor configured to:
    create a model containing privacy information about a user of a computer;
    extract the privacy information from the model;
    analyze the information entered into the computer by the user, wherein the information is entered through an input method editor, and
    wherein the input method editor is configured to receive logogram-based language inputs;
    determine that the user has entered any of the privacy information into the computer; and
    if the processor has determined that the user has entered any of the privacy information, then the processor is configured to prevent any recording or storing of the privacy information by the input method editor.

8. The system of claim 7, wherein the processor is further configured to iteratively create a model containing privacy information about a user of a computer, and to extract the privacy information from the model to initially create the model and then refine the model.

9. The system of claim 7, wherein the processor is further configured to perform a machine learning process.

10. The system of claim 7, wherein the processor is further configured to analyze the information entered into one or more locations on a screen display.

11. The system of claim 10, wherein the processor is further configured to determine that the user has entered any of the privacy information into the one or more locations on a screen display.

12. The system of claim 7, wherein the processor is further configured to analyze the information entered into the computer by the user by one of input methods, a webpage, and an operating system.

13. A computer program product comprising:
    a non-transitory storage medium readable by a processing circuit and storing instructions for execution by the processing circuit for performing a method comprising:
    creating, by a processor, a model containing privacy information about a user of a computer;
    extracting, by the processor, the privacy information from the model;
    analyzing, by the processor, the information entered into the computer by the user, wherein the information is entered through an input method editor, and
    wherein the input method editor is configured to receive logogram-based language inputs;
    determining, by the processor, that the user has entered any of the privacy information into the computer; and
    if the processor has determined that the user has entered any of the privacy information, preventing, by the processor, any recording or storing of the privacy information by the input method editor.

14. The computer program product of claim 13, wherein creating, by a processor, a model containing privacy information about a user of a computer, and extracting, by the processor, the privacy information from the model, may be iteratively performed to initially create the model and then refine the model.

15. The computer program product of claim 13, wherein creating, by a processor, a model containing privacy information about a user of a computer comprises a machine learning process.

16. The computer program product of claim 13, wherein analyzing, by the processor, the information entered into the computer by the user further comprises analyzing, by the processor, the information entered into one or more locations on a screen display.

17. The computer program product of claim 16, wherein determining, by the processor, that the user has entered any of the privacy information into the computer further comprises determining, by the processor, that the user has entered any of the privacy information into the one or more locations on a screen display.

\* \* \* \* \*